Feb. 26, 1957 A. H. FILANDER 2,782,897
JAR-CAPPING APPARATUS
Filed Aug. 31, 1953 4 Sheets-Sheet 1

INVENTOR
ARTHUR H. FILANDER
BY
Synnestvedt & Lechner
ATTORNEYS

Feb. 26, 1957 A. H. FILANDER 2,782,897
JAR-CAPPING APPARATUS
Filed Aug. 31, 1953 4 Sheets-Sheet 2
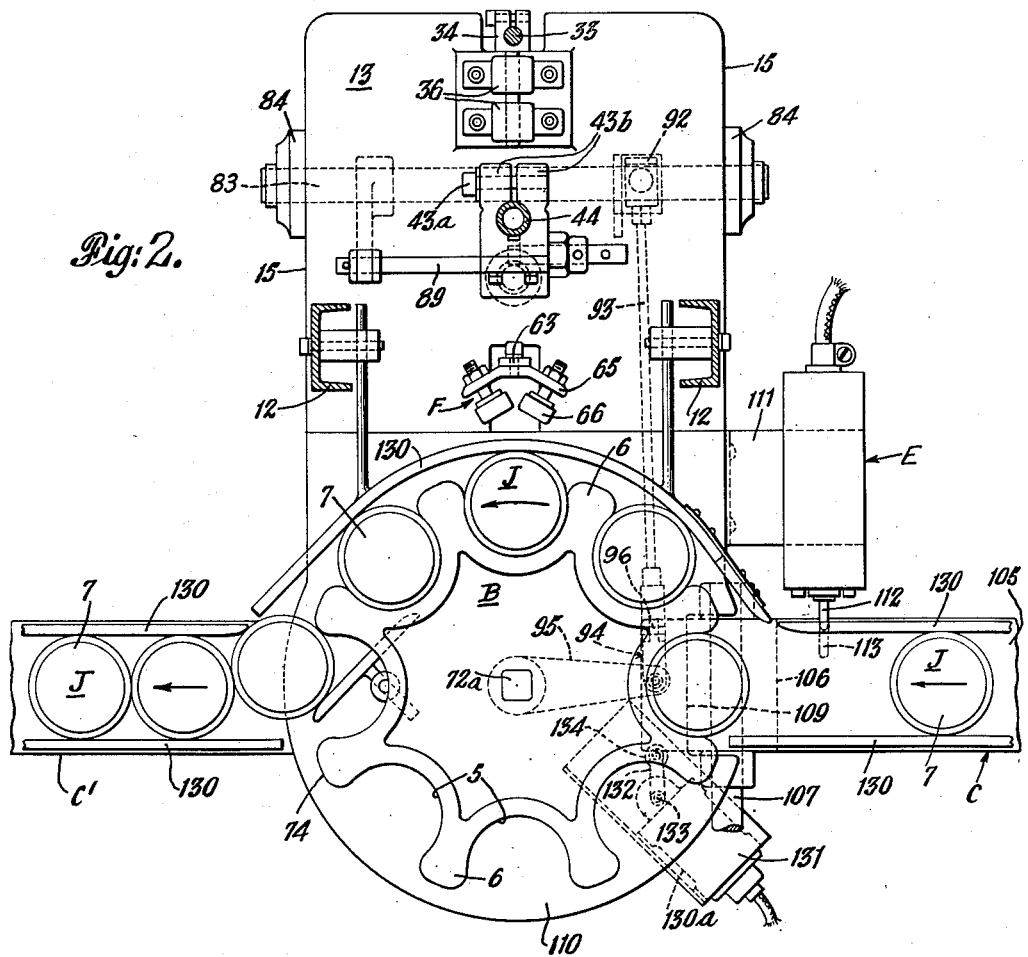
Fig:2.
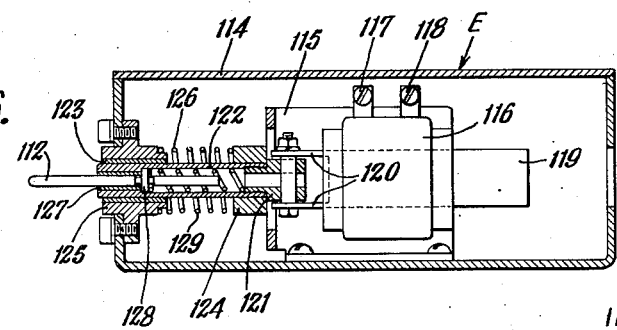
Fig:6.
INVENTOR
ARTHUR H. FILANDER
BY
Synnestvedt & Lechner
ATTORNEYS Feb. 26, 1957 A. H. FILANDER 2,782,897
JAR-CAPPING APPARATUS
Filed Aug. 31, 1953 4 Sheets-Sheet 4
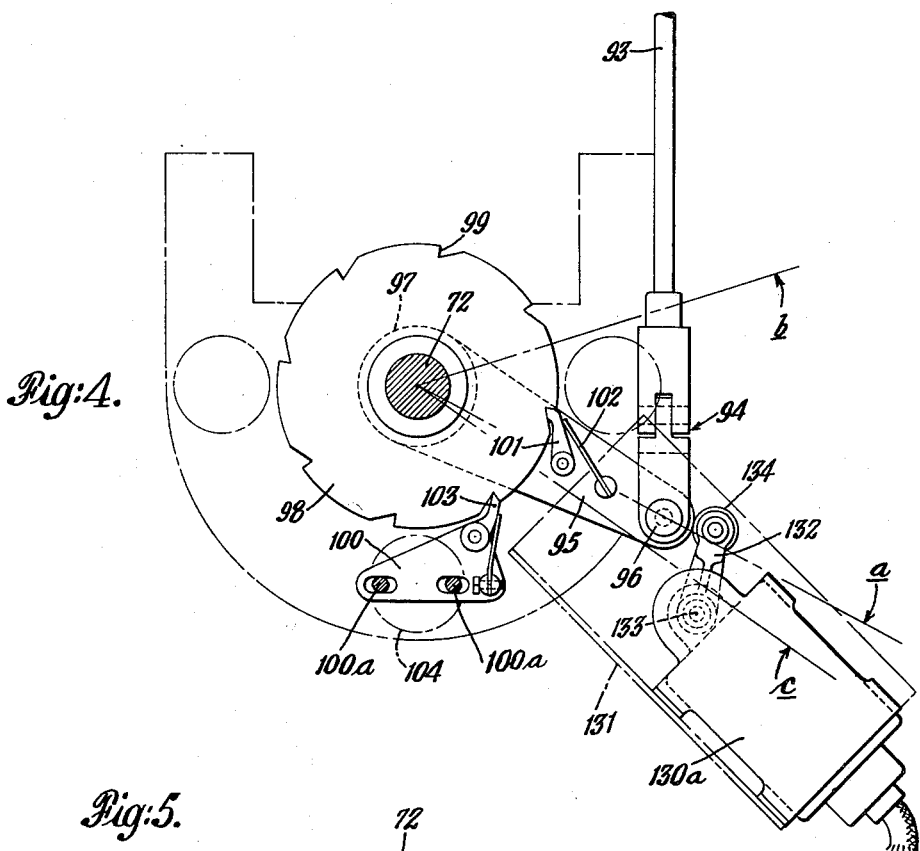
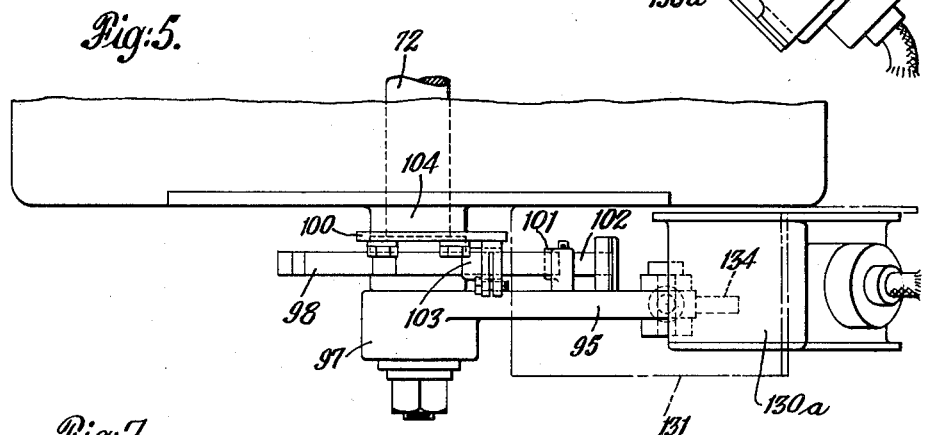
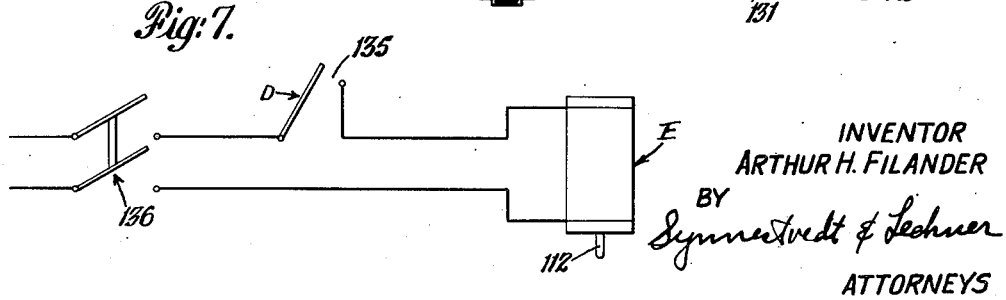
INVENTOR
ARTHUR H. FILANDER
BY
Synnestvedt & Lechner
ATTORNEYS

United States Patent Office 2,782,897
Patented Feb. 26, 1957

2,782,897

JAR-CAPPING APPARATUS

Arthur H. Filander, Baltimore, Md., assignor to Franklin Balmar Corporation, a corporation of Delaware Application August 31, 1953, Serial No. 377,483

2 Claims. (Cl. 198—22)

This invention relates to jar-capping apparatus, for example, capping apparatus adapted to handle glass jars and, in particular, is concerned with an improvement in such apparatus which greatly minimizes or prevents the possibility of jar breakage.

Apparatus of the general kind in question is disclosed in my copending application, Serial No. 319,392, filed November 7, 1952, issued January 8, 1957, as Patent No. 2,776,531, and assigned to the assignee of the present invention. Preferably such apparatus comprises a reciprocating cup-shaped rotary capping head adapted to engage and tighten a cap on a jar, a jar gripper adapted to engage the sides of the jar and hold the same in position during the capping operation, and a jar feeder arranged for intermittent motion in a horizontal plane having a plurality of pockets for receiving jars and successively positioning the same under the head for the capping operation. These elements have common driving mechanism adapted to operate them in timed sequence. A conveyor belt is adapted to supply jars with caps loosely placed thereon to the pockets of the feeder.

In operation the conveyor belt is usually continuously moving and the jars are placed thereon in closely spaced or abutting relationship. Where the close spacing is not maintained, i. e., where there is a relatively large open space between adjacent jars or between two groups of closely spaced jars, breakage may take place. Such breakage occurs as follows: During the capping operation the feeder is stationary and ordinarily the pocket open to the conveyor would be filled with a jar. However, in cases where the above-mentioned spacing occurs between jars, the pocket may be empty. After the capping operation, the capper and grips are moved away from the jar, and the feeder begins to rotate to move the next jar into capping position. Where the conveyor supplies a jar to the feeder at the time the feeder is beginning to move, the jar may contact the feeder and be flung backwards at a high rate. If another jar is in the way, breakage will occur. The rapidity at which the jar may be moved backwards will be better appreciated when it is realized that the components of the apparatus move at a rate for capping fifty to sixty jars per minute.

I have substantially eliminated the breakage problem by providing mechanism operated in timed relation with the feeder, which prevents an oncoming jar from being pushed into the feeder when the feeder is starting to rotate.

This mechanism preferably takes the form of a finger adapted to be inserted into the path of feed of the jars. The finger is controlled by a solenoid which moves the same into or out of the feed path at the appropriate time. The solenoid is controlled by means of a limit switch which is connected to and operated by drive mechanism for the feeder.

The manner in which the foregoing is carried out, together with the advantages of the invention will be readily apparent from the following description and drawings wherein:

Figure 2 is a plan view partially in section taken along the line 2—2 of Figure 1;

Figure 4 is an enlarged plan section taken along the line 4—4 of Figure 1 illustrating the manner in which the limit switch is operated;

Figure 5 is an enlarged fragmentary section looking upwardly in Figure 4;

Figure 6 is an elevational view partially in section showing the solenoid assembly and finger; and Figure 7 is a schematic wiring diagram showing the limit switch contacts connected with the solenoid.

Figure 1:
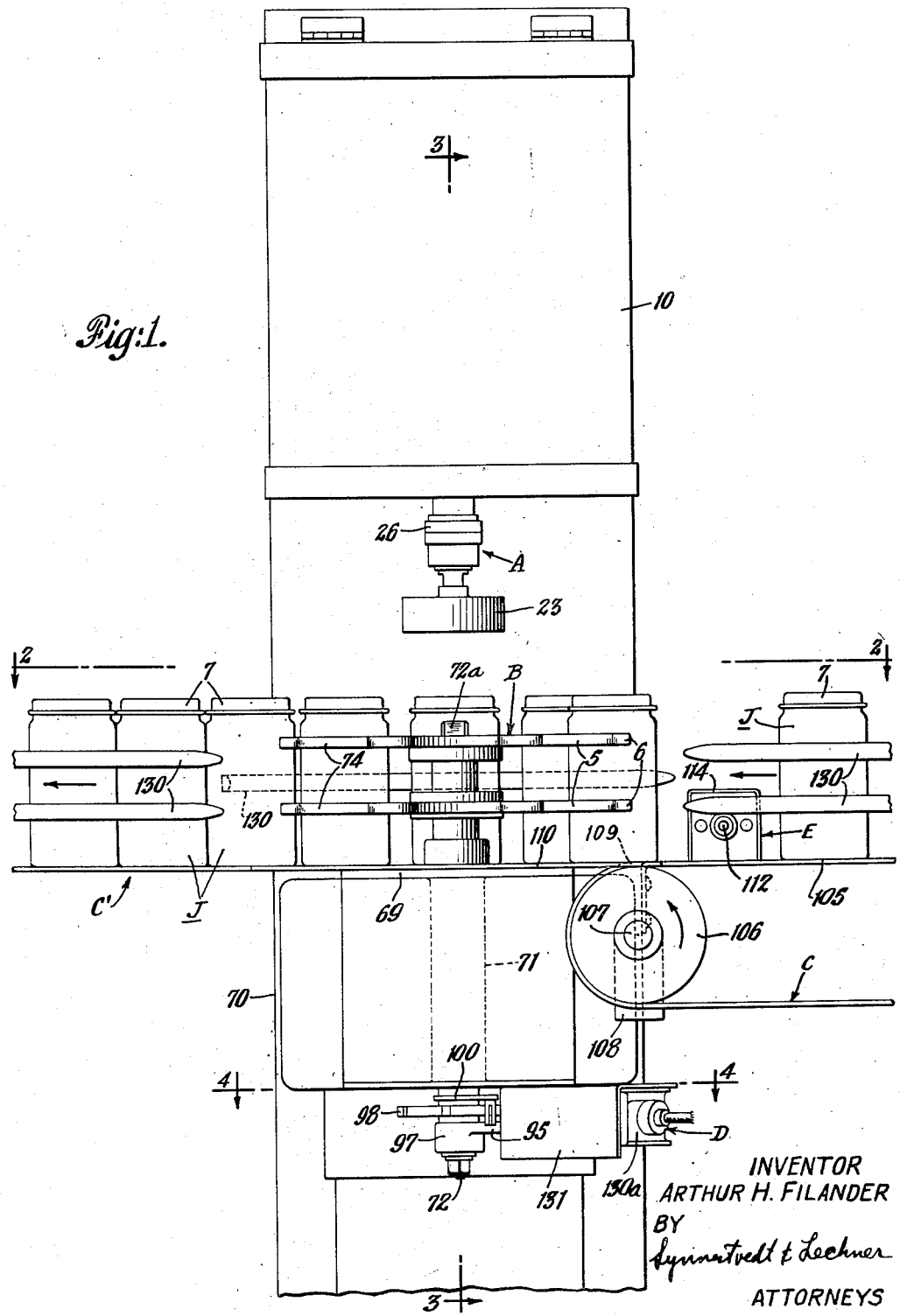
Figure 1 is a front elevation showing jar-capping apparatus incorporating the preferred embodiment of my invention.
Figure 3:
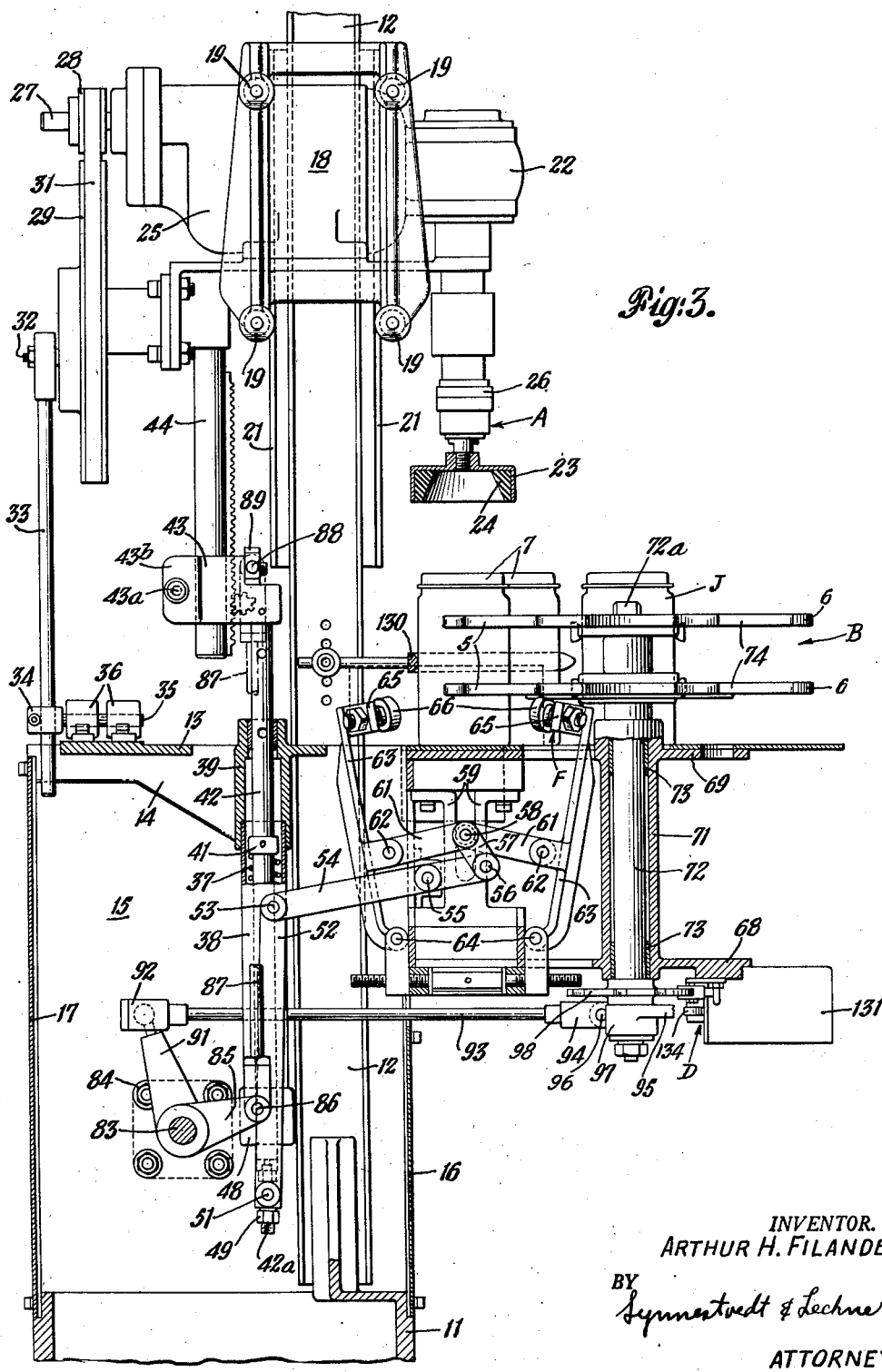
Figure 3 is an elevational view partially in section taken along the line 3—3 of Figure 1.

In Figure 1 the reference character A designates the capper mechanism with certain parts thereof located behind the cover 10; the reference character B designates the jar feeder assembly; C designates the conveyor mechanism; D designates the limit switch assembly; and E designates the solenoid assembly. In Figure 3 the reference character F generally designates the jar grippers. In both of these views the jars are indicated by the reference character J.

The movement of the jars through the machine will be explained in connection with Figure 2.

The conveyor C is adapted to deliver the jars J (from right to left) to the feeder B, which has a plurality of pockets 5 formed between the radially extending arms 6. The feeder intermittently rotate counter-clockwise through an angle of 45° to successively position the jars adjacent the grippers F and capper A (not shown) for the capping operation and then toward the left where the jars are taken away by the conveyor C'. The jars moving along the conveyor C have caps 7 loosely disposed thereon.

The general arrangement of the apparatus will now be described.

With reference to Figure 3, the numeral 11 designates a base with main upright frame member 12, a cross frame 13 having a reinforcing rib 14, side wall structures 15—15, bottom front cover plate 16 and rear cover plate 17.

The capper mechanism comprises a carriage 18 incorporating wheels 19 adapted to ride vertically on trackways 21, which are fixed to the frame structure 12. The motor 22 on the carriage is adapted to rotate the cup-shaped cap-setting head 23 through the intermediation of a gear box 25 and adjustable torque-limiting clutch 26. It will be observed that the head 23 has a conical liner 24 of rubber or the like for gripping and spinning the caps tightly on the jar.

On the back of the machine a shaft 27 driven by motor 22 carries a pulley 28, which drives a larger pulley 29 by means of belt 31. The pulley 29 has an eccentric crank 32 on which is pivoted the upper end of a rod 33, which, at its lower end, is fixed by a bracket 34 to a rocker shaft 35 mounted in bearings 36, which are carried by the frame structure 13. By means of the above-described assembly the rotation of motor 22 causes the capper mechanism to ride up and down in a generally vertical plane on the tracks 21.

A portion of the weight of the capper mechanism is taken by the spring 37 disposed in tubular casing 38, which is fixed in the tubular boss 39 of the frame structure. The collar 41 fixed on the vertically reciprocable shaft 42 holds the spring in place. The upper end of the shaft 42 is fixed in a clamp bracket 43, which is secured to a shaft 44 by the bolt 43a acting on the legs 43b—43b. The shaft 44 is fixed to the carriage 18.

The gripper mechanism and the manner in which the vertical reciprocations of the capper mechanism are coordinated with the gripping of the jars such that the jars are held against turning when the head descends to tighten up the jar cap will next be described.

As mentioned above, the rod 42 reciprocates with the carriage 18 carrying the capping head 23. This rod has a bottom extension 42a protruding through a closure cap 48 of the tube 38. The rod extension 42a is adjustably and pivotally connected at 49 and 51 with upwardly extending link 52. The upper end of link 52 is pivoted at 53 to rocking lever 54 mounted on the fixed pivot 55. The other end of rocking lever 54 is pivoted at 56 to link 57, which carries a pivot 58 mounted in guideways 59 fast on the frame. The pivot 58 is coupled with links 61—61 respectively pivoted at 62—62 to the gripper arms 63—63, which have fixed pivotal mountings 64 at their lower ends and carry gripper heads 65 at their upper ends, each head having a pair of adjustable buttons of rubber or the like 66 for holding the jars.

As will be apparent from the above description, the vertical reciprocating motion of the capper mechanism causes the grippers to grip and release the jars. The linkage is arranged such that the grippers securely hold the jar while the head spins on the cap.

The feeder assembly and the driving means which coordinate the operation of this assembly with the capper and gripper therefor will next be described.

The assembly is mounted on a bracket fixed to the front of the machine comprising a base plate 68, a top plate 69, vertical braces 70—70, and a central bracing tube 71, in which is mounted a rotary feeder shaft 72 by means of sleeve bearings 73—73 and thrust bearings (not shown) disposed at the top of the shaft.

The square upper end 72a of shaft 72 carries a pair of star-wheels 74—74 secured thereto in a manner described in my Patent No. 2,776,531. Rotation of the shaft rotates the star-wheel.

The drive mechanism for the shaft is explained following. A rock-shaft 83 (see Figures 2 and 3) is mounted in bearings 84—84 between the plates 15—15. The shaft is rocked by means of an arm 85 fixed thereon and pivotally connected at 86 to the lower end of a push-pull rod 87, the upper end of which is pivoted at 88 to a drive arm 89 fastened to the bracket 43, which, as has been explained before, moves up and down with the carriage 18.

Arm 91 is also fixed on shaft 83 and has a ball joint connection 92 with the rod 93, which moves back and forth as the shaft 83 rocks. The other end of rod 93 has a clevis arrangement 94 pivoted to the arm 95 as by pivot 96. The arm 95 is thus moved by the rod 93. The arm 95 is formed with a mounting collar 97 so that it is freely movable on the lower end of shaft 72. Just above these parts is a ratchet wheel 98 fixed to the shaft 72.

As best seen in Figure 4, the reciprocations of rod 93 and of the arm 95 will be transmitted to the ratchet disk 98 by means of the pivoted pawl 101, which is carried on the arm 95 and is urged by spring 102 against the edge of the ratchet. A second pawl 103 is pivoted on a fixed boss 104 on the base plate 68 in a position to engage the teeth of the ratchet disk 98 and is disposed so as to prevent undesired backlash of the latter. Any necessary adjustment of the pawl 103 is secured by means of the slotted mounting bracket 100 and locking screws 100a.

The operation of the ratchet will be apparent from an inspection of Figure 4. As the rod 93 moves upwardly, the pawl 101 engaging the ratchet teeth 99, moves the ratchet counter-clockwise, hence moving the shaft 72 and the star-wheel 74—74 in the same direction. As the rod 93 moves downwardly, the ratchet wheel remains in a fixed position, since the pawl 101 rides over the wheel surface. The arm 95 preferably has a total angular travel of 105°, that is, 52½° in each direction. The ratchet wheel 98, hence the star-wheels 74—74, have a total unidirectional travel of 45°. The manner in which this is done and the coordination between this motion and that of the grippers and the capper is described following.

In Figure 4 assume the rod 93 to be moving in the upward direction with the center line of the arm 95 momentarily lying along the line designated by the letter a. The pawl 101 is engaged with a tooth 99 on the ratchet wheel. As the rod 93 moves upwardly, the arm 95 rotates counter-clockwise until the center line of the arm is coincident with the line designated by the numeral b. The arrangement is such that the rod 93 moves the arm 95 from a to b an angular distance of 45°. Thus, it will be apparent that the ratchet 98, hence the star-wheels 74—74, have been moved 45°.

When the arm 95 reaches the line b, the rod is reversed in direction and the arm 95 is rotated clockwise toward the line a. During this interval of time, i. e., from b to a, the grippers and the capper perform their respective operations. When the arm 95 reaches the line a, the rod 93 continues to move the arm until the center line thereof reaches the line c. The direction of movement of the rod 93 then reverses to move the arm from the line c to the line a. The arrangement is such that the rod 93 moves the arm 95 from b to c (or c to b) an angular distance of 7½°. During this interval of time, i. e., from a to c to a, the grippers are released from the jar and the capper moved upwardly. Also, during this time the mechanism for preventing breakage is in operation, as will be explained later.

In connection with the ratchet wheel 98, it is pointed out that the number of teeth on the wheel and the angular spacing therebetween corresponds to the number and angular spacing of the pairs of jar-receiving pockets in the star-wheel 74—74. It will be understood that when star-wheels having different numbers of pockets are substituted for the ones shown, the ratchet wheel will change accordingly.

The conveyor belt system for moving the belt toward and away from the feeder will next be described.

As seen in Figure 1, the conveyor C preferably comprises an endless belt 105, the upper pass of which is moved preferably continuously in the direction of the arrow as by power driven rotation of the wheel 106, which is mounted on a shaft 107 on a bracket 108, which may be secured to some fixed part of the machine or be separately supported. The wheel 106 lies close to a recess 109 formed at the edge of plate 110 and the top of the wheel is preferably so disposed that the top surface of the belt is substantially even with the top surface of the plate 110 with the belt commencing to pass downwardly over the wheel closely adjacent to the inner edge of the recess. Jars are thus adapted to pass from the belt to the plate where they are engaged and moved by the pockets in the star-wheels. The conveyor C' is not shown in detail as it may be arranged in a manner similar to conveyor C with a belt moving to carry the jars away from the feeder. As will be apparent, the two conveyors are provided with a plurality of guide rails generally designated by the numeral 130.

The mechanism for preventing jar breakage will next be described.

As seen in Figure 2, the solenoid assembly E is secured to a bracket 111 attached to the frame of the machine. The solenoid assembly has a finger 112 which normally remains in the position shown in Figure 2 and when the solenoid is energized, the finger protrudes into the path of feed of the jars such as indicated by the dotted lines 113. The solenoid and the details of the finger structure are shown in Figure 6. The solenoid may be of standard construction comprising a frame 115 having means for securing the same to the housing 114, coils 116 having terminals 117 and 118, the core 119 having outwardly extending arms 120. A threaded member 121 having threads engaging the sleeve 122 is secured to the arms 120. The sleeve 122 is secured in a bushing 123 within the mounting member 125 fixed to the housing 114. Fixedly mounted on the sleeve 122 and abutting against the frame 115 is a bushing 124. A spring 126 is disposed between the bushing 124 and the mounting member 125. As will be apparent, the spring acts to hold sleeve 122 and core 119 in position. Within the sleeve 122 is a bushing 127 which mounts the finger 112. The finger has a collar 128 engaging a spring 129, the other end of which abuts the threaded member 121. The spring 129 pushes on the collar 128 and positions the finger in the manner shown.

The position of the components as shown in Figure 6 is with the solenoid de-energized. When the solenoid is energized, the core is moved to the left (the motion being resisted by spring 126) which also moves the finger 112 to the left. It will be apparent that if the motion of the finger 112 were restrained, the core would continue to move, since the finger will move back within the sleeve 122 against the action of spring 129.

The limit switch D is best seen in Figure 4 and comprises a housing 130a attached to a bracket 131 secured to the base plate 68. The switch has an arm 132 pivoted at 133, which operates the switch contacts (see Figure 7). The outer end of the arm carries a roller 134, which is adapted to be actuated by the outer end of arm 95.

As will be apparent from an inspection of Figure 7, the solenoid is adapted to be energized when the contacts 135 of the limit switch are closed. Power is supplied through the switch 136.

The manner in which the breakage prevention mechanism operates will next be explained.

With reference to Figure 4, it will be recalled that when the arm 95 is being moved from lines *a* to *c* to *a*, the end thereof contacts the roller 134 of the limit switch which acts to close the contacts 135. Thus, the solenoid is energized and the finger 112 is inserted in the path of feed to stop any oncoming jars. The solenoid remains energized and the finger in its outward position during this period.

In Figure 2, the rod 93 is moving downwardly to move the arm 95 clockwise (toward the line *a* in Figure 4) and the capper and grippers are moving in a direction toward the jar. Assume at this time that the pocket in the feeder opposite the conveyor is empty. After the arm 95 has been moved from line *a* to *c* and then starts back from line *c*, assume that a jar nears the empty pocket. When the arm 95 has reached the line *c*, the star-wheels of the feeder begin to move at a very rapid rate and an arm 6 would contact the oncoming jar and fling the same backwards, which would result in breakage in the event of another jar in its path.

However, with the above-described arrangement, jars are prevented from reaching the feeder as it begins to move and thus breakage is not likely to occur.

As mentioned in connection with the description of the solenoid, the finger is arranged such that it may be displaced relative to the solenoid core. If a jar arrives in position in front of the solenoid at the time the solenoid is energized, the outcoming finger will contact the jar but not break the same because of the displacement feature. In cases where a jar is so engaged and is not one of a group moving along the conveyor, the finger will hold the jar provided contact is not made beyond the jar's center line (to the right as viewed in Figure 2). Where the jar is one of a group, the finger will allow the jar to pass. Thus, with groups of closely spaced jars on the conveyor belt, the power switch 136 may be in closed position so that the finger is ready to perform its intended function when the need arises.

I claim:

1. In jar-capping apparatus, a conveyor for delivering jars; a rotatable jar feeder having a predetermined period of dwell and provided with a plurality of pockets to receive jars from the conveyor; driving mechanism for the feeder including a toothed ratchet wheel connected with the feeder and a reciprocating arm having a pawl adapted to engage said teeth to rotate the wheel; a finger disposed along the conveyor and arranged to move toward and away from the jar delivery path; a solenoid for moving the finger including a coil and a core connected with the finger and a spring connected with the core to urge the finger out of the delivery path when the solenoid is de-energized; and a switch electrically connected with said coil having a contact arm engageable with first said arm, the switch being arranged so that when the two said arms are engaged the switch is closed to energize the solenoid, whereby the finger is moved into the jar delivery path, said engagement taking place for a predetermined period just before said pawl engages a tooth.

2. A construction in accordance with claim 1 wherein the connection between the core and the finger includes a spring.

References Cited in the file of this patent

UNITED STATES PATENTS

| | | |
|---|---|---|
| 1,422,229 | Sharp | July 11, 1922 |
| 1,671,804 | Alexanderson | May 29, 1928 |
| 1,673,091 | Risser | June 12, 1928 |
| 1,754,461 | Cundall | Apr. 15, 1930 |
| 1,770,530 | Oslund | July 15, 1930 |
| 1,835,335 | Risser | Dec. 8, 1931 |
| 1,872,000 | Keller et al. | Aug. 16, 1932 |
| 2,559,242 | Boegley et al. | July 3, 1951 |